United States Patent
Mosko (10) Patent No.: US 10,802,775 B2
(45) Date of Patent: Oct. 13, 2020

(54) SYSTEM AND METHOD FOR AUTOMATIC ON-BOARDING OF PRINTERS IN A PRINTER MANAGEMENT SYSTEM

(71) Applicant: Palo Alto Research Center Incorporated, Palo Alto, CA (US)

(72) Inventor: Marc E. Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 78 days.

(21) Appl. No.: 16/045,504

(22) Filed: Jul. 25, 2018

(65) Prior Publication Data
US 2020/0034094 A1   Jan. 30, 2020

(51) Int. Cl.
G06F 3/12    (2006.01)
H04L 29/12   (2006.01)

(52) U.S. Cl.
CPC .......... *G06F 3/1226* (2013.01); *G06F 3/1204* (2013.01); *G06F 3/1231* (2013.01); *H04L 61/103* (2013.01); *G06F 3/1284* (2013.01); *H04L 61/6022* (2013.01)

(58) Field of Classification Search
CPC .... G06F 3/1226; G06F 3/1204; G06F 3/1231; G06F 3/1284; G06F 3/1293; G06F 3/1236; G06F 3/1285; G06F 3/1287; G06F 3/1288; H04L 61/103; H04L 61/6022

See application file for complete search history.

(56) References Cited

U.S. PATENT DOCUMENTS 8,107,396 B1 *   1/2012   Sharma ................. H04L 61/103
                                                              370/254
2014/0297890 A1 * 10/2014  Boddu ................. H04L 61/2076
                                                              709/245

* cited by examiner

*Primary Examiner* — Kent Yip
(74) *Attorney, Agent, or Firm* — Shun Yao; Park, Vaughan, Fleming & Dowler LLP (57) ABSTRACT

One embodiment provides a system for facilitating device discovery. During operation, the system detects, by a computing device, a first message which is broadcast from a source device based on a network communication protocol. The system determines a classification which is a type for the source device based on a MAC address of the source device extracted from the first message. The system generates a second message which indicates the MAC address, an IP address of the source device obtained based on the first message, and the classification. The system sends the second message to a device management system, which causes the device management system to add the source device as a managed device. The system enhances device discovery by eliminating a direct scan of all devices on a sub-network by the device management system for devices of a same type as the type for the source device.

20 Claims, 7 Drawing Sheets

SYSTEM AND METHOD FOR AUTOMATIC ON-BOARDING OF PRINTERS IN A PRINTER MANAGEMENT SYSTEM

BACKGROUND

Field

This disclosure is generally related to device discovery. More specifically, this disclosure is related to a system and method for automatic on-boarding of printers in a printer management system.

Related Art

The proliferation of the Internet and e-commerce continues to create a vast amount of digital content. An enterprise or large corporation may include a network of printers to handle tasks associated with printing out digital content. In such a network of printers, a printer management system may manage printers on multiple sub-networks. In a conventional printer management system, the system can discover new printers by scanning a sub-network, e.g., via a Simple Network Management Protocol (SNMP) query or a Hypertext Transfer Protocol (HTTP) query. However, a large national enterprise may include a nationwide network with millions of devices. Scanning each sub-network using an SNMP or HTTP query to ping each of the millions of devices can be costly (e.g., computationally expensive) and inefficient. This can result in an inefficient printer management system for managing and discovering new printers which come online in a sub-network of the network of the enterprise.

SUMMARY

One embodiment provides a system for facilitating device discovery. During operation, the system detects, by a computing device, a first message which is broadcast from a source device based on a network communication protocol. The system determines a classification which indicates a type for the source device based on a Media Access Control (MAC) address of the source device extracted from the first message. The system generates a second message which indicates the MAC address, an IP address of the source device obtained based on the first message, and the classification. The system sends the second message to a device management system, which causes the device management system to add the source device as a managed device. The system enhances device discovery by eliminating a direct scan of all devices on a sub-network by the device management system for devices of a same type as the type for the source device.

In some embodiments, in response to determining that the network communication protocol is an Address Resolution Protocol (ARP), the system: extracts from the first message the MAC address and the IP address of the source device; and stores, in a data structure, the MAC address, the IP address, and the classification of the source device.

In some embodiments, in response to determining that the network communication protocol is a Dynamic Host Configuration Protocol (DHCP) and subsequent to determining the classification, the system: extracts from the first message the MAC address of the source device; generates a reverse Address Resolution Protocol (ARP) packet which includes a destination MAC address which is the MAC address of the source device, and further includes a query for the IP address of the source device; in response to transmitting the reverse ARP packet to the source device, obtains the IP address of the source device; and stores, in a data structure, the MAC address, the obtained IP address, and the classification of the source device.

In some embodiments, detecting the first message is further based on one or more of: a rendezvous protocol which allows the computing device to determine the classification with a high level of confidence; and a link broadcast which allows the computing device to obtain a link-local address or a discovery gateway, and to use the obtained link-local address or discovery gateway to extract the MAC address of the source device.

In some embodiments, determining the classification which indicates the type for the source device is based on an organizationally unique identifier (OUI) extracted from the MAC address of the source device. The system learns classifications for OUIs by: reporting all learned OUIs to the device management system; and receiving feedback from the device management system. The feedback indicates one or more of: a corresponding classification for a respective OUI; a first list of OUIs which are to be classified as a same type as the type for the source device; a second list of OUIs which are not to be classified as the same type as the type for the source device; and a third list of OUIs which are to remain unclassified.

In some embodiments, the system improves the classification by sending a local query to the source device based on the MAC address, which involves one or more of: connecting to a Line Printer Remote (LPR) protocol port; connecting to an Internet Printing Protocol (IPP) port; sending a Simple Network Management Protocol (SNMP) query; querying a configuration for an Internet Printing Protocol (IPP); and in response to sending a HyperText Transfer Protocol (HTTP) request, analyzing headers of a responsive HTTP packet. The second message further indicates a reason for the classification, and the reason is based on a result of sending the local query.

In some embodiments, the second message further indicates one or more of: an identifier for the computing device; a time associated with generating the second message; and a confidence rating which indicates a level of certainty that the classification of the source device is accurate.

In some embodiments, the source device is a printer, and the device management system is a printer management system. The computing device is a network probe device or another printer managed by the printer management system.

In some embodiments, the system stores, in a data structure, an entry which includes the MAC address, the IP address, and the classification of the source device, wherein the MAC address is used as a key to search entries in the data structure.

In some embodiments, the system receives, by the device management system, the second message. The system generates, by the device management system, a configuration file destined for the source device, wherein adding the source device as a managed device is in response to confirming, by the device management system, the source device based on the generated configuration file.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which solves the time-consuming and high traffic-generating problems resulting from conventional device discovery, which involves sub-network scanning of and communicating with all the devices on a sub-network. The system accelerates the discovery process and can significantly reduce the incurred network traffic by overhearing broadcast messages from source devices, extracting the MAC and IP addresses from the broadcast messages, classifying the likelihood that the device is a certain type of device, and reporting the information to a device management system. One example of discoverable devices is printers, which can be managed by a printer management system.

An enterprise or large corporation may include a network of printers to handle tasks associated with printing out digital content. In such a network of printers, a printer management system may manage printers on multiple sub-networks. In a conventional printer management system, the system can discover new printers by scanning a sub-network, e.g., via an SNMP query or an HTTP query. However, a large national enterprise may include a nationwide network with millions of devices. Scanning each sub-network using an SNMP or HTTP query to communicate with each of the millions of devices to identify and manage potential printers can be costly (e.g., computationally expensive) and inefficient. This can result in an inefficient printer management system for managing and discovering new printers which come online in a sub-network of the enterprise network.

The embodiments described herein overcome these inefficiencies by improving the efficiency, performance, and cost of a device management system in discovering devices of a type managed by the device management system. Some classes of devices, such as printers, have a high likelihood of classification based on the MAC address of a respective device. The system can overhear broadcast messages from such a device (a "source device," such as a printer), extract the respective MAC address, and subsequently classify the source device as a certain type (e.g., as a printer). The system can also verify the classification of the source device, which results in improving the efficiency and performance of the device management system.

During operation, a device management system can overhear messages which are broadcast by "source devices". The system can use network probes on remote network segments to overhear such broadcast messages. The system can extract the MAC address and the IP address from these broadcast messages. One example of a broadcast message is an Address Resolution Protocol (ARP) message, while another example of a broadcast message is a Dynamic Host Configuration Protocol (DHCP) message. Subsequent to detecting the broadcast message and based on the MAC address of a source device, the system can classify the type of the source device, e.g., as a printer. The system can perform optional probing to improve the classification by communicating directly with the source device. The system can store the discovered MAC address along with the corresponding (and optionally improved) classification for the source device, which eliminates the need for the system to re-evaluate the same MAC address indicated in a subsequent broadcast message. If the system has classified the source device as a certain type of device (e.g., a printer), the system can notify the printer management system that the source device is a printer. The system can use a network probe to: overhear broadcast messages; classify a device type; perform additional probing; store IP and MAC address associations; and notify the printer management system. In some embodiments, another device (e.g., another printer) can act as the network probe and perform these functions. Upon receiving the notification from the network probe (or another printer), the printer management system can add the source device as a managed printer, and send the correct configuration file to the managed printer.

Thus, the embodiments described herein provide a computer system which improves the ability of a system to manage printers in a large network comprised of multiple sub-networks, where the number of total devices across the large network and included in all of the multiple sub-networks is in the hundreds of thousands, or even millions. By effectively and efficiently detecting printers which arrive onto the network (e.g., come online), a printer management system can efficiently add a detected printer as a managed entity of the printer management system. The system thus enhances and improves the technological area of printer discovery by overhearing broadcast message from potential source devices and acting on the overheard messages. This eliminates the need for the printer management system to communicate directly with each and every device in a single sub-network or in a group of sub-networks (e.g., sub-network scanning).

The claimed system is a technological solution (a system which detects broadcast messages, extracts identifying information, and classifies a source device) to a technological problem (discovering a certain type of device which come online in large network with a huge number of devices). Furthermore, the improvements are fundamentally technological, can result in a more efficient printer management system, and can be applied to a variety of practical, concrete, and tangible applications, as described herein.

The following terms and definition are used in this disclosure:

The term "source device" refers to a device which is managed by a specific device management system. Examples of source devices include printers, card readers, televisions, and certain industrial equipment.

The term "device management system" or "device management station" refers to a system or station which manages devices of a same or similar kind to each other. One example of a device management system/station is a printer management system/station.

The term "probe" or "network probe" refers to a computing device which performs the functions described herein for "the system," e.g.: overhearing broadcast messages, determining a classification for the broadcast message, improving the classification, tracking extracted identifying information (MAC and IP) of a source device (or "a printer"), reporting or notifying the device management system (or the "printer management system"), which causes the device management system to perform any on-boarding procedures with the reported source device.

Overview of Device Discovery and Device Management System

Broadcast Detection: The system can detect or overhear a broadcast message. If the broadcast message is an ARP message, the system can extract the MAC address and the IP address for the source device. If the broadcast message is a DHCP message, the system likely only overhears the broadcast request, which does not include an IP address. The DHCP response is usually a unicast MAC datagram and thus cannot be overheard on an Ethernet switch. Thus, if the system classifies the source device as a printer, the system can generate a reverse ARP, e.g., an ARP packet which carries as its destination MAC address the MAC address detected from the broadcast DHCP request, and which queries for the destination IP address. In this way, the system can learn the IP address assigned to the target (i.e., the source device).

As a specific example, some printers can advertise their presence with rendezvous protocols, such as Bonjour. In these cases, the system can learn of the printer's MAC address and IP address, and immediately proceed with a high-confidence classification of the device as a printer. Other known protocols are available for use with printers and other devices.

Classification: The system can filter broadcast-detected MAC addresses by classifying them as potential printers. This is because a MAC address contains an organizationally unique identifier (OUI). Each printer from a different manufacturer is associated with a distinct OUI which can be learned or pre-programmed into the system. Indeed, there may be several well known OUIs, such as from Xerox, HP, or Lexmark, which have a high correlation to a specific MAC address. Furthermore, the system can learn OUI classifications by reporting all OUIs to the management system, and waiting for feedback from the management station if or when the MAC address is determined to be associated with a printer. The system can also perform a secondary (or "improved") classification (as described below) to improve the system's estimate of the OUI as a printer.

Additional Probing or Local Query: The system can perform a secondary messaging process to evaluate whether a detected MAC address is a printer. For ARP snooping, this process may begin immediately. For DHCP snooping, the system can wait a sufficient amount of time for the source device to obtain an IP address, generate a reverse ARP packet to obtain the IP address, and subsequently begin the probing or local query process. This process of secondary messaging can include secondary queries or methods which are in common use by printer management stations, including: connecting to a Line Printer Remote (LPR) protocol port; connecting to an Internet Printing Protocol (IPP) port; sending a Simple Network Management Protocol (SNMP) query; querying a configuration for Internet Printing Protocol (IPP); and in response to sending an HTTP request, analyzing headers of a responsive HTTP packet. The system can improve its classification of the source device based on the results or responses to these secondary queries.

Tracking: The system can keep track of which MAC addresses are classified as a certain type, e.g., as a printer, to avoid future duplicate work. The system can store the MAC address, the IP address, and the classification for a source device in a database. Because the MAC address generally does not change, the system can use the MAC address as a primary key to such a database.

Reporting: The system can generate a message which indicates the (extracted) MAC address, the (obtained) IP address, and the (improved) classification, and send this message to the device management station. For example, the system can send to the printer management system a tuple, such as: {probe_id, probe_time, target_MAC, target_IP, confidence}. The "confidence" parameter can be a measure of the system's confidence that the target is a printer. A high level of confidence can be a rating or level which exceeds a predetermined threshold. The system may also include a reason for the classification (e.g., "OUI match," "IPP port available," and "SNMP query result"). Recall that the system may receive OUI reports from the printer management system, where an OUI report can inform the system which OUIs to consider as a printer (whitelist), or which to exclude from consideration as a printer (blacklist), or which to leave unspecified. A probe can have a Transport Layer Security (TLS)-protected Transmission Control Protocol (TCP) connection to the printer management system, which allows the probe to report its results securely inside the protected channel.

On-Boarding: Once the printer management system receives the notification (via a report or a message), the printer management system can perform its normal actions for adding a discovered IP address. For example, the printer management system can perform additional probing (e.g., by running a local query, as discussed herein and in relation to FIG. 1). The printer management system can generate a configuration file and send the configuration file to the source device, which can execute the configuration file and send back a confirmation. In some embodiments, the printer management system can seek administrator approval or act based on a preconfigured condition for adding a printer to the system.

Thus, the embodiments described herein provide a system which, by overhearing broadcast messages and extracting relevant identifying information for subsequent communications and confirmation, effectively and efficiently detects when a new device comes online, and can add the detected new device as a managed device of the device management system. The system enhances and improves device discovery by overhearing broadcast messages from potential devices of a same type as the type managed by the device management system, and acting on the overheard messages, which eliminates the need for the device management system to communicate directly with each and every device that comes online in a single or a group of sub-networks (e.g., as in the conventional sub-network scanning).

Exemplary Environment and Communication

Figure 1:
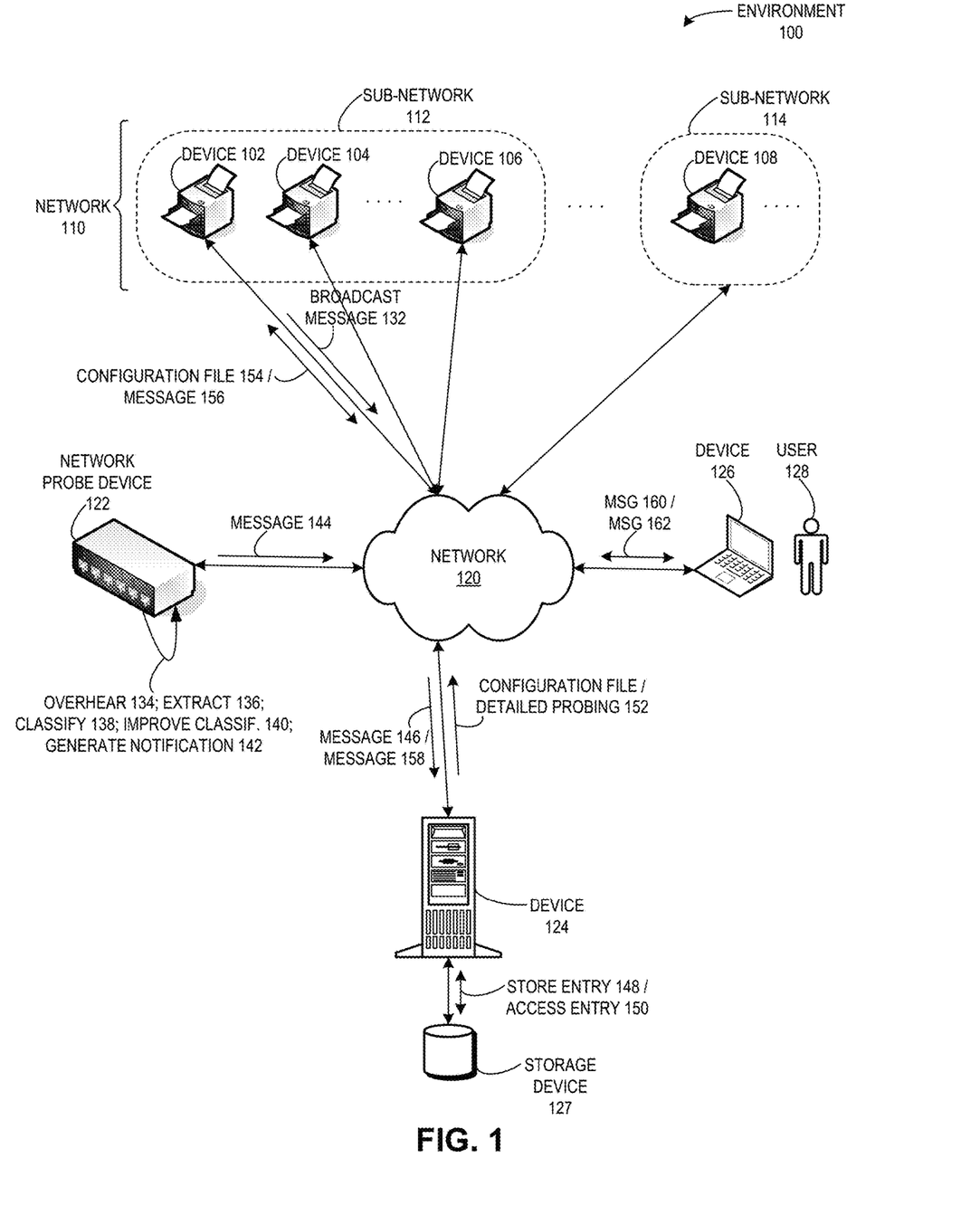
FIG. 1 illustrates an exemplary environment for facilitating printer discovery, in accordance with an embodiment of the present invention.

FIG. 1 illustrates an exemplary environment 100 for facilitating printer discovery, in accordance with an embodiment of the present invention. Environment 100 can include a network 110 which includes multiple sub-networks (e.g., a sub-network 112 and a sub-network 114). Sub-network 112 can include multiple devices, including a device 102, a device 104, and a device 106. Sub-network 114 can also include multiple devices, including a device 108. Devices in a sub-network can be a same type of device, e.g., all printers.

Environment 100 can also include a network probe device ("probe") 122, a device 124 coupled to a storage device 125, and a device 126 with an associated user 128. Device 124 can be a printer management system and devices 102-108 can be printers. Devices 102-108, 122, 124, and 126 can communicate with each other via a network 120. Some of these devices can detect or overhear broadcast messages which are sent via network 120.

During operation, printer 102 can send a broadcast message 132 via network 120. Probe 122 can overhear broadcast message 132 (function 134), and can extract the MAC address and the IP address of printer 102 from broadcast message 132 (function 136), as described below in relation to FIGS. 3A and 3B. Based on the MAC address of printer 102, probe 122 can classify printer 102 as a type (function 138). Probe 122 can improve the classification (function 140) by sending a local query (not shown) to printer 102, as described below in relation to FIGS. 2 and 3A, and as described above in "Additional Probing or Local Query." Finally, probe 122 can generate a notification (function 142, resulting in a message 144) destined for printer management system 124. Message 144 can include the MAC address and the IP address of printer 102, where the identifying information of printer 102 was overheard and extracted from the previously broadcast message 132. Message 144 can also include the improved classification for the corresponding source device (i.e., printer 102).

Upon receiving message 144 (e.g., a message 146), printer management system 124 can save the MAC address, the IP address, and the (optionally improved) classification of printer 102 in a data structure or a database (e.g., storage device 125) via a store entry 148 function. Printer management system 124 can then send a configuration file or perform detailed probing via a communication 152. Printer 102 can receive configuration file/detailed probing 152 (e.g., configuration file 154), and can return a message 156 with a confirmation indicating receipt and/or execution of the configuration file, or with a response to the detailed probing. Upon receiving message 156 (e.g., a message 158), printer management system 124 can add printer 102 as a managed entity of printer management system 124.

After printer management system 124 adds printer 102 to its list of managed entities, printer 102 may appear as an available printer for use by a user who has access to the sub-network in which printer 102 resides. For example, user 128 may receive, via device 126, a message 160 that printer 102 is available for use, and user 120 may then utilize printer 102, e.g., by sending an electronic document to be physically printed out on printer 102 (via a message 162).

Thus, the entities and communications described above in environment 100 depict a system which facilitates and enhances printer discovery by eliminating a direct scan of all devices on a sub-network by a printer management system for potential source devices which are of the same type as the devices (i.e., printers) managed by the printer management system. For example, the depicted system enhances printer discovery by eliminating a direct scan of all devices on all sub-networks (i.e., 112, 114, etc.) by printer management system 124 for potential source devices which are printers. In this way, the embodiments described herein provide an improved technological solution to the technological problem of inefficient discovery of similar devices in a large network comprised of multiple sub-networks, wherein the large network includes a large number of devices on the order of hundreds of thousands and millions.

Method for Facilitating Device Discovery (by a Network Probe)

Figure 2:
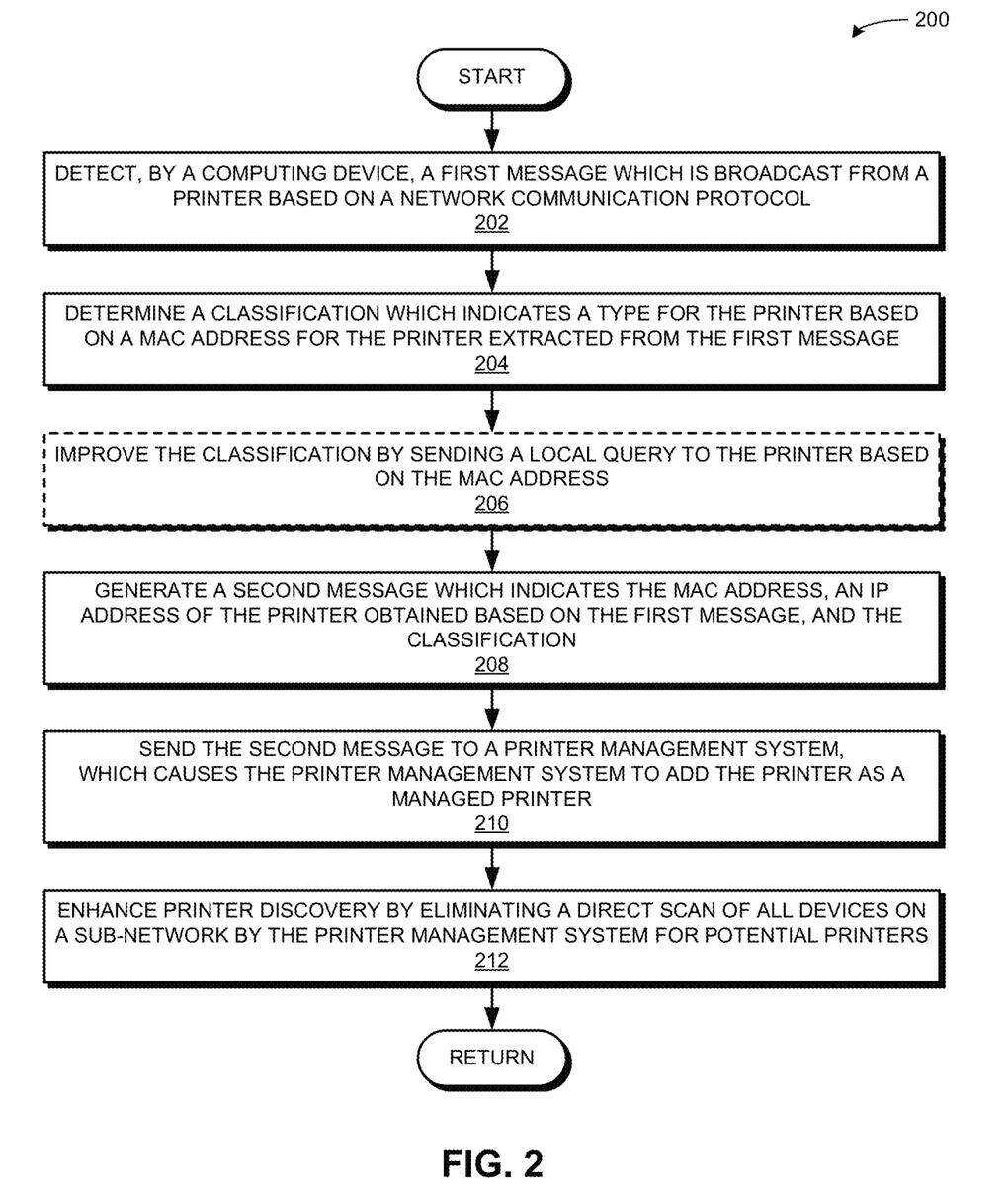
FIG. 2 presents a flow chart illustrating a method for facilitating printer discovery, in accordance with an embodiment of the present invention.

FIG. 2 presents a flow chart 200 illustrating a method for facilitating printer discovery, in accordance with an embodiment of the present invention. During operation, the system detects, by a computing device, a first message which is broadcast from a printer based on a network communication protocol (operation 202). The computing device can be a network probe device (e.g., network probe device 122 of FIG. 1A) or another same type device on a same or a different sub-network as the printer (e.g., device 108 of FIG. 1A). The network communication protocol can be ARP or DHCP, as described below in relation to FIGS. 3A and 3B. Detecting the first message can also be based on a rendezvous protocol or a link broadcast. The system determines a classification which indicates a type for the printer based on a MAC address of the printer extracted from the first message (operation 204). Determining the classification can be based on an organizationally unique identifier (OUI) extracted from or included in the MAC address of the printer. The system can optionally improve the classification by sending a local query to the printer based on the MAC address (operation 206). As described above in the section title "Additional Probing or Local Query," the system can improve the classification based on a local query or method, such as: connecting to an LPR or IPP port; sending an SNMP query; querying for IPP; and analyzing HTTP headers.

The system generates a second message which indicates the MAC address, an IP address of the printer obtained based on the first message, and the classification (operation 208). The system can also store, in a database or a data structure, an entry which includes the MAC address, the IP address, and the improved classification of the printer, and use the MAC address as the key for the database or data structure. The system sends the second message to a printer management system, which causes the printer management system to add the printer as a managed printer (operation 210). The system enhances printer discovery by eliminating a direct scan of all devices on a sub-network by the printer management system for potential printers (operation 212).

Figure 3A:
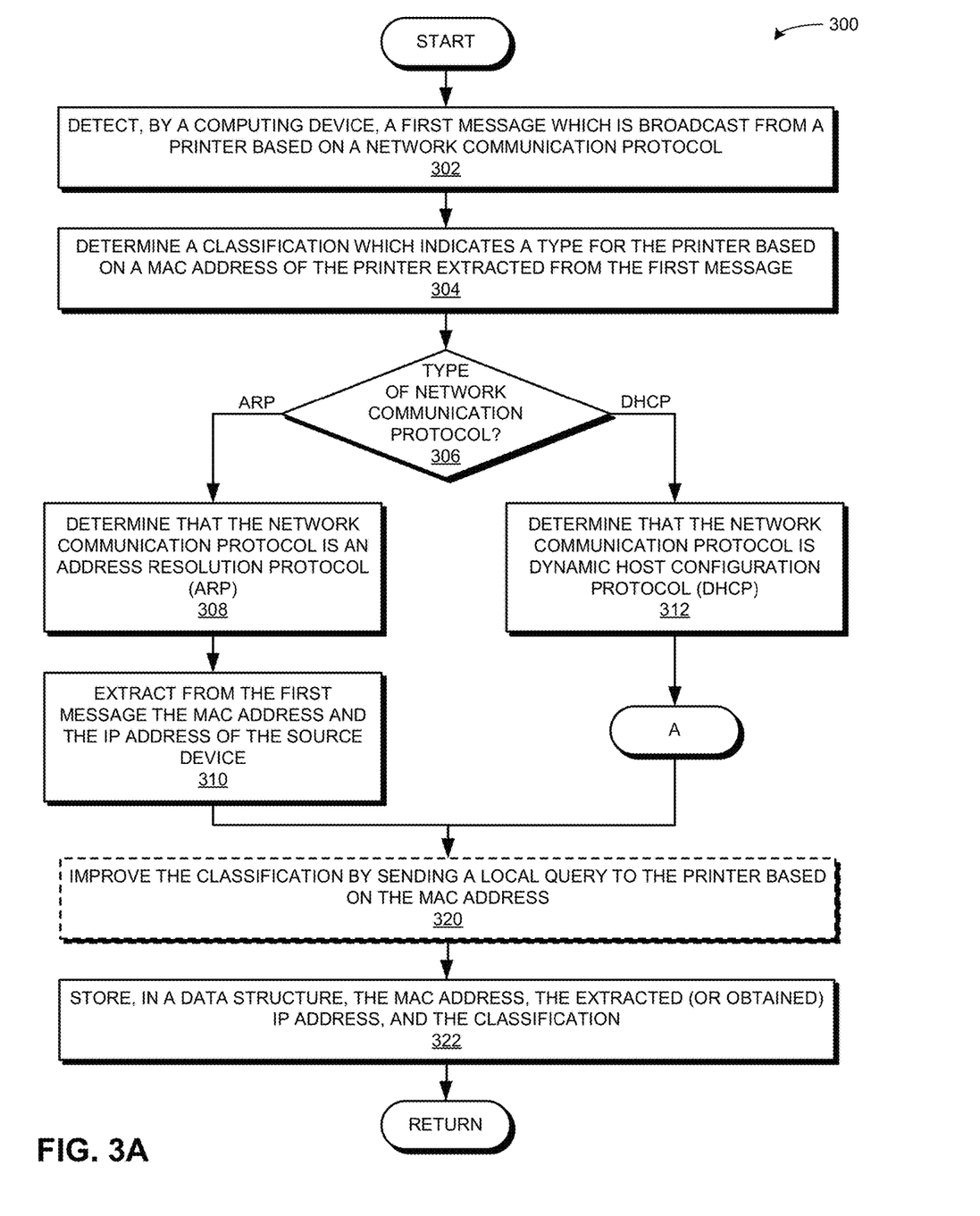
FIG. 3A presents a flow chart illustrating a method for facilitating printer discovery, including based on an ARP message, in accordance with an embodiment of the present invention.

FIG. 3A presents a flow chart 300 illustrating a method for facilitating printer discovery, including based on an ARP message, in accordance with an embodiment of the present invention. During operation, the system detects, by a computing device, a first message which is broadcast from a printer based on a network communication protocol (operation 302, which is similar to operation 202). The network communication protocol can be ARP or DHCP, as described below. The system determines a classification which indicates a type for the printer based on a MAC address of the printer extracted from the first message (operation 304). The system determines the type of network communication protocol (decision 306). If the network communication protocol is ARP (decision 306), the system determines that the network communication protocol is an Address Resolution Protocol (ARP) (operation 308), and that the first message is an ARP message. The system extracts from the first message the MAC address and the IP address of the source device (operation 310). The system can optionally improve the classification by sending a local query to the printer based on the MAC address (operation 320, which is similar to operation 206). The system stores, in a data structure, the MAC address, the extracted (or obtained) IP address, and the classification (operation 322).

If the network communication protocol is DHCP (decision 306), the system determines that the network communication protocol is a Dynamic Host Configuration Protocol (DHCP) (operation 312), and that the first message is a DHCP message. The operation continues as described at Label A of FIG. 3B.

Figure 3B:
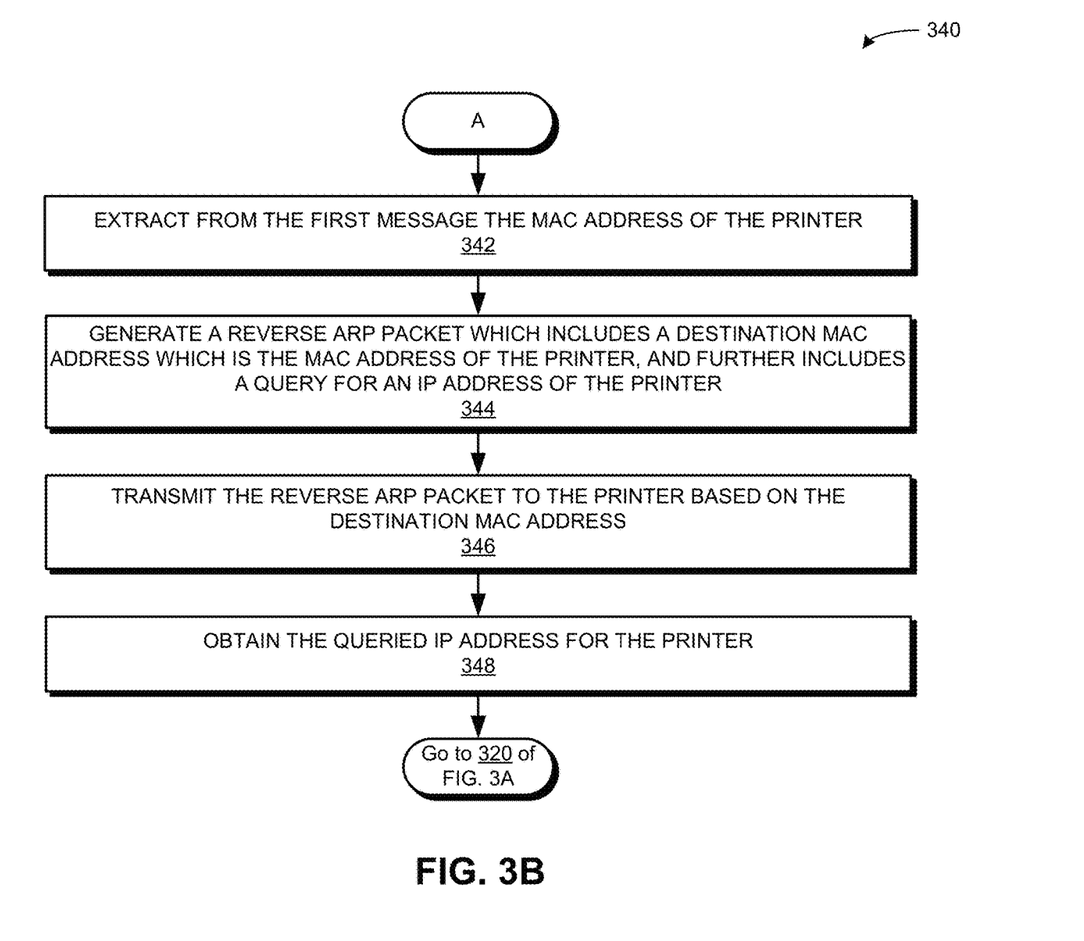
FIG. 3B presents a flow chart illustrating a method for facilitating printer discovery, including based on a DHCP message, in accordance with an embodiment of the present invention.

FIG. 3B presents a flow chart 340 illustrating a method for facilitating printer discovery, including based on a DHCP message, in accordance with an embodiment of the present invention. At Label A, the system extracts from the first message the MAC address of the printer (operation 342). The system generates a reverse ARP packet which includes a destination MAC address which is the MAC address of the printer, and further includes a query for the IP address of the printer (operation 344). The system transmits the reverse ARP packet to the printer based on the destination MAC address (operation 346), and in response, obtains the queried IP address for the printer (the "obtained IP address) (operation 348). The operation continues as described at operation 320 of FIG. 3A. The system can optionally improve the classification by sending a local query to the printer based on the MAC address (operation 320). The system stores, in a data structure, the MAC address, the extracted (or obtained) IP address, and the classification (operation 322).

Method for Facilitating Device Discovery (by a Device Management System)

Figure 4:
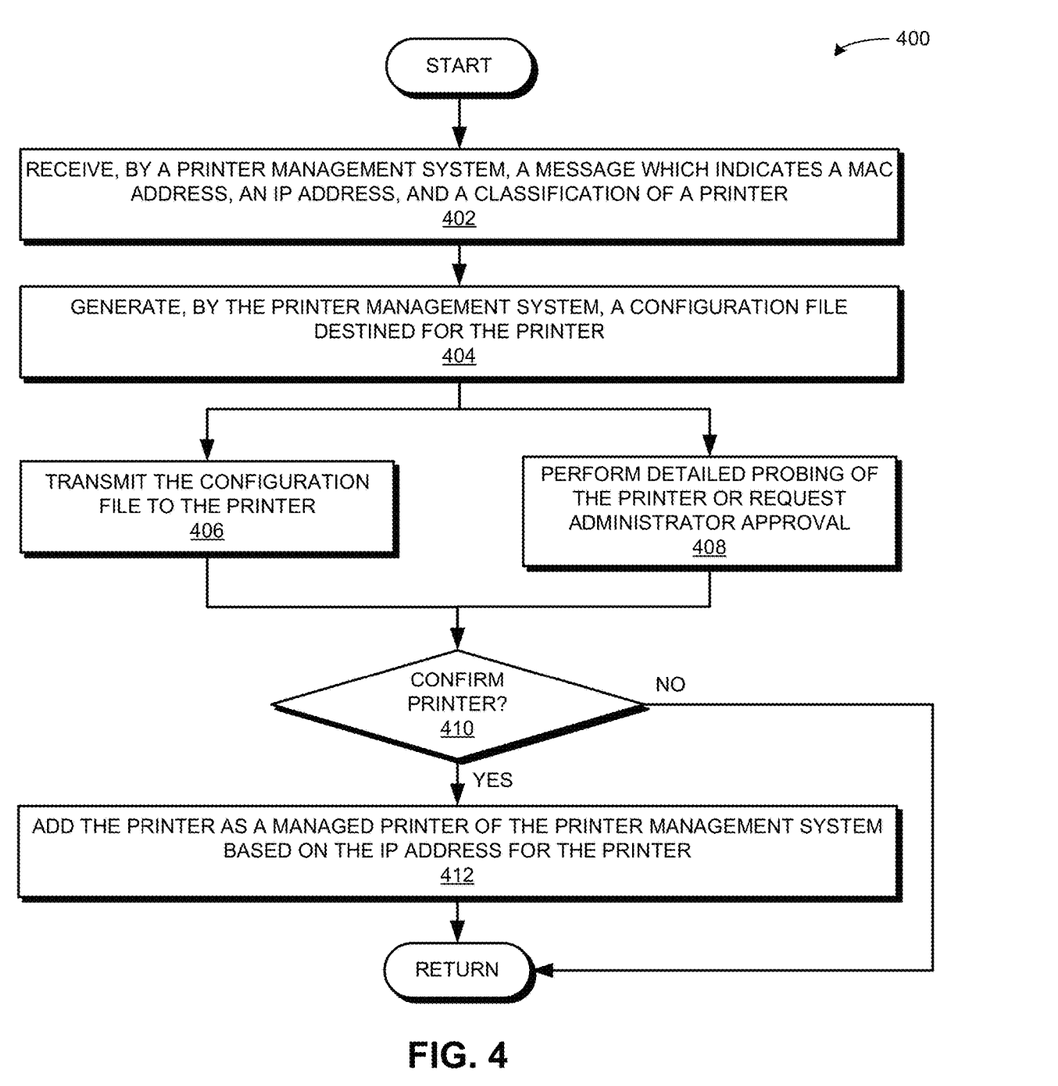
FIG. 4 presents a flow chart illustrating a method by a printer management system for facilitating printer discovery, in accordance with an embodiment of the present invention.

FIG. 4 presents a flow chart 400 illustrating a method by a printer management system for facilitating printer discovery, in accordance with an embodiment of the present invention. During operation, the system receives, by a printer management system, a message which indicates a MAC address, an IP address, and a classification of a printer (operation 402). The message can be received from a network probe or another printer managed by the printer management system. The printer management system generates a configuration file destined for the printer (operation 404). The printer management system transmits the configuration file to the printer (operation 406), which can result in the printer receiving and executing the configuration file (not shown). The printer management system can transmit the configuration file based on the IP address of the printer. The printer can send a confirmation to the printer management system (not shown), which allows the printer management system to confirm the printer (decision 410) and add the printer as a managed printer of the printer management system based on the IP address for the printer (operation 412). If the printer management system does not confirm the printer (decision 410), the operation returns.

The printer management system can also perform detailed probing of the printer or request administrator approval (operation 408), similar to the local querying described above and performed by the network probe in "Additional Probing or Local Query." That is, the printer management system can improve the classification based on a local query or method, such as: connecting to an LPR or IPP port; sending an SNMP query; querying for IPP; and analyzing HTTP headers.

If the printer management system confirms the printer (decision 410) (by receiving, e.g., a response to a local query, or an approval or confirmation in response to the request for administrator approval), the printer management system adds the printer as a managed printer of the printer management system based on the IP address of the printer (operation 412). If the printer management system does not confirm the printer (decision 410), the operation returns.

Exemplary Computer and Communication System; Exemplary Apparatus

Figure 5:
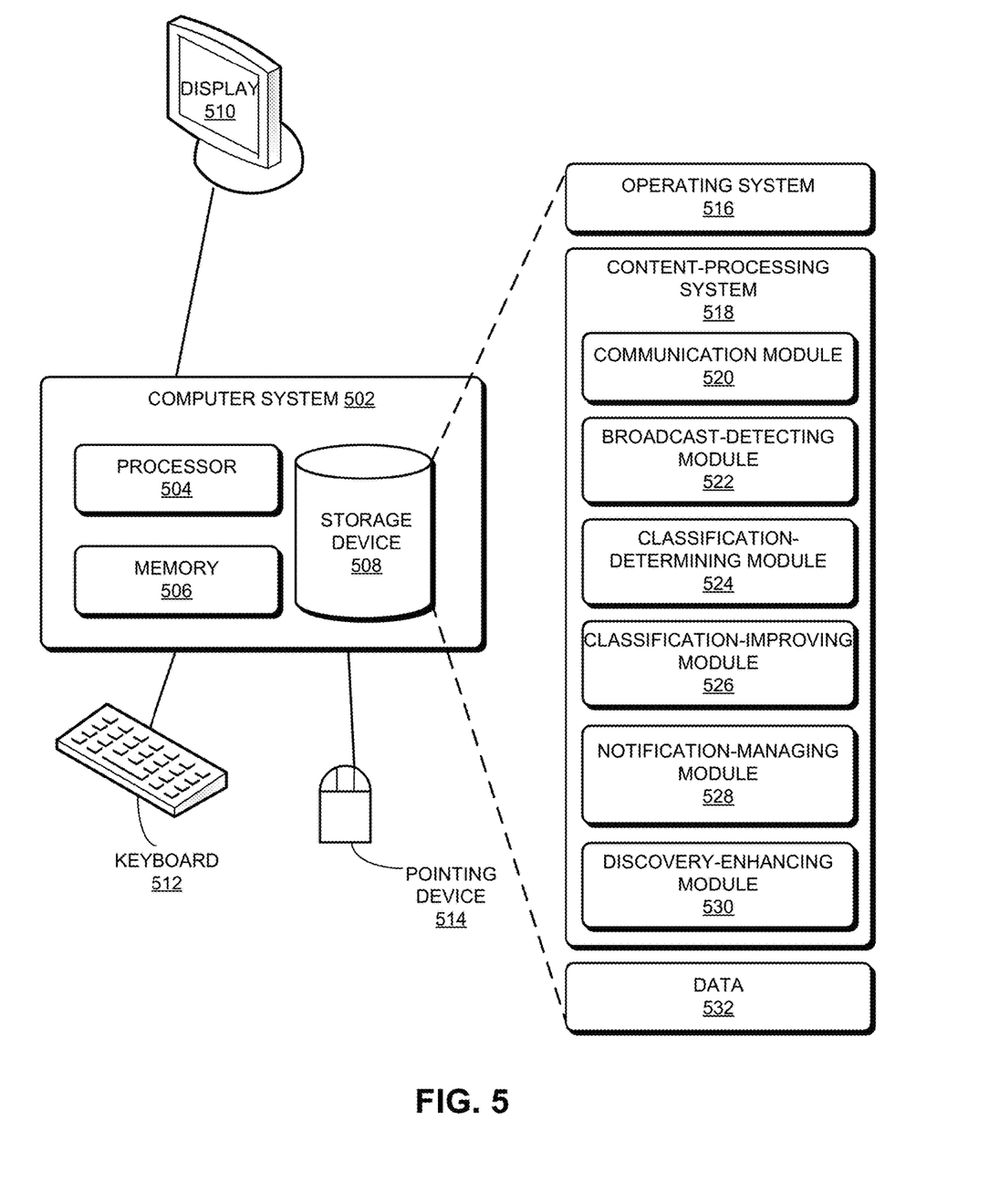
FIG. 5 illustrates an exemplary distributed computer and communication system that facilitates printer discovery, in accordance with an embodiment of the present invention.

FIG. 5 illustrates an exemplary distributed computer and communication system 502 that facilitates printer discovery, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network (communication module 520). A data packet can include a broadcast message, a message or notification, a query, a report, a MAC address, an IP address, and a classification.

Content-processing system 518 can further include instructions for detecting, by a computing device, a first message which is broadcast from a printer based on a network communication protocol (broadcast-detecting module 522). Content-processing system 518 can include instructions for determining a classification which indicates a type for the printer based on a MAC address of the printer extracted from the first message (classification-determining module 524). Content-processing system 518 can include instructions for generating a second message which indicates the MAC address, an IP address of the printer obtained based on the first message, and the classification (notification-managing module 528). Content-processing system 518 can include instructions for sending the second message to a printer management system (communication module 520), which causes the printer management system to add the printer as a managed printer (discovery-enhancing module 530). Content-processing system 518 can include instructions for enhancing printer discovery by eliminating a direct scan of all devices on a sub-network by the printer management system for potential printers (discovery-enhancing module 530).

Content-processing system 518 can also include instructions for improving the classification by sending a local query to the printer based on the MAC address (classification-improving module 526).

Data 532 can include any data that is required as input or that is generated as output by the methods and/or processes described in this disclosure. Specifically, data 532 can store at least: a message; a broadcast message; an ARP message; a reverse ARP packet; a DHCP message; a network communication protocol; a classification; a type; a MAC address; an IP address; an improved classification; a local query; a data structure; an entry in a data structure; a key; a rendezvous protocol; a level of confidence; a link broadcast; a link-local address; a discovery gateway; an OUI; feedback which indicates a classification for an OUI; a list OUIs which are to be classified as printers; a list of OUIs which are not to be classified as printers; a list of OUIs which are to remain unclassified; a result of connecting to an LPR or IPP port; an SNMP query; a configuration for an IPP; an HTTP request packet; an HTTP response packet; a reason for a classification; an identifier for a computing device; a time; a confidence rating; a predetermined threshold; an indicator of a network probe device or another printer; and a configuration file.

Figure 6:
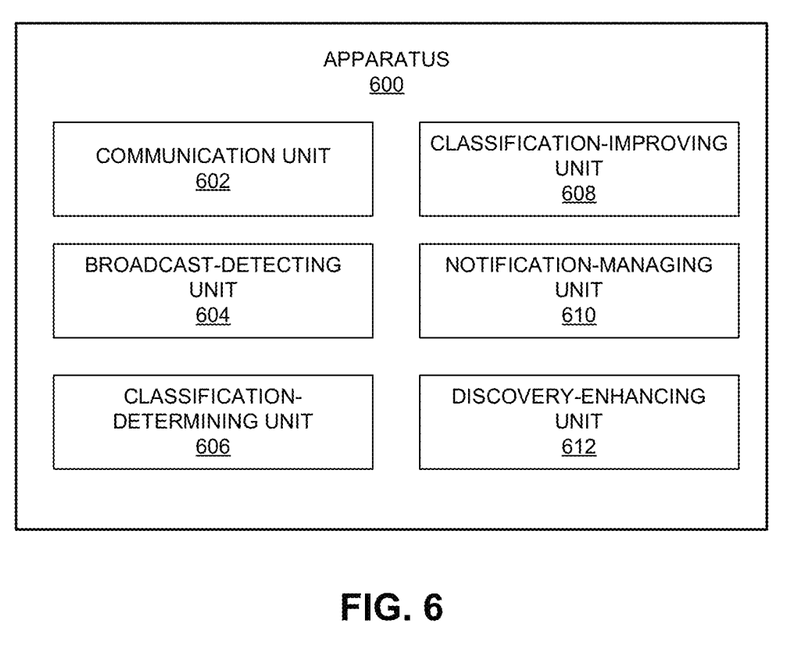
FIG. 6 illustrates an exemplary apparatus that facilitates printer discovery, in accordance with an embodiment of the present application.

FIG. 6 illustrates an exemplary apparatus 600 that facilitates printer discovery, in accordance with an embodiment of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Specifically, apparatus 600 can comprise units 602-612 which perform functions or operations similar to modules 520-530 of computer system 502 of FIG. 5, including: a communication unit 602; a broadcast-detecting unit 604; a classification-determining unit 606; a classification-improving unit 608; a notification-managing unit 610; and a discovery-enhancing unit 612.

Note that while FIGS. 1, 2, 3A, and 3B describe operations specific to a source device which is a printer, and while FIGS. 4-6 describe a device management system which is a printer management system, other embodiments can include similar operations for different types of source devices (e.g., card readers, televisions, and certain industrial equipment) and a corresponding device management system for the specific type of source device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating device discovery, the method comprising:
   detecting, by a computing device, a first message which is broadcast from a source device based on a network communication protocol;
   determining a classification which indicates a type for the source device based on a Media Access Control (MAC) address of the source device extracted from the first message and further based on learned classifications for organizationally unique identifiers (OUIs) and a respective OUT extracted from the MAC address;
   improving the determined classification by sending a local query to the source device based on the MAC address;
   generating a second message which indicates the MAC address, an Internet Protocol (IP) address of the source device obtained based on the first message, and the classification, wherein the second message further indicates a reason for the classification, and wherein the reason is based on a result of sending the local query;
   sending the second message to a device management system, which causes the device management system to add the source device as a managed device; and
   enhancing device discovery by eliminating a direct scan of all devices on a sub-network by the device management system for devices of a same type as the type for the source device.

2. The method of claim 1, wherein in response to determining that the network communication protocol is an Address Resolution Protocol (ARP), the method further comprises:
   extracting from the first message the MAC address and the IP address of the source device; and
   storing, in a data structure, the MAC address, the IP address, and the classification of the source device.

3. The method of claim 1, wherein in response to determining that the network communication protocol is a Dynamic Host Configuration Protocol (DHCP) and subsequent to determining the classification, the method further comprises:
   extracting from the first message the MAC address of the source device;
   generating a reverse Address Resolution Protocol (ARP) packet which includes a destination MAC address which is the MAC address of the source device, and further includes a query for the IP address of the source device;
   in response to transmitting the reverse ARP packet to the source device, obtaining the IP address of the source device; and
   storing, in a data structure, the MAC address, the obtained IP address, and the classification of the source device.

4. The method of claim 1, wherein detecting the first message is further based on one or more of:
   a rendezvous protocol which allows the computing device to determine the classification with a high level of confidence; and
   a link broadcast which allows the computing device to:
      obtain a link-local address or a discovery gateway; and
      use the obtained link-local address or discovery gateway to extract the MAC address of the source device.

5. The method of claim 1, further comprising:
learning classifications for the OUIs by:
reporting all learned OUIs to the device management system; and
receiving feedback from the device management system which indicates one or more of:
a corresponding classification for a respective OUI;
a first list of OUIs which are to be classified as a same type as the type for the source device;
a second list of OUIs which are not to be classified as the same type as the type for the source device; and
a third list of OUIs which are to remain unclassified.

6. The method of claim 1,
wherein improving the determined classification by sending the local query to the source device based on the MAC address involves one or more of:
connecting to a Line Printer Remote (LPR) protocol port;
connecting to an Internet Printing Protocol (IPP) port;
sending a Simple Network Management Protocol (SNMP) query;
querying a configuration for an Internet Printing Protocol (IPP); and
in response to sending a HyperText Transfer Protocol (HTTP) request, analyzing headers of a responsive HTTP packet.

7. The method of claim 1, wherein the second message further indicates one or more of:
an identifier for the computing device;
a time associated with generating the second message; and
a confidence rating which indicates a level of certainty that the classification of the source device is accurate.

8. The method of claim 1, wherein the source device is a printer, wherein the device management system is a printer management system, and wherein the computing device is a network probe device or another printer managed by the printer management system.

9. The method of claim 1, further comprising:
storing, in a data structure, an entry which includes the MAC address, the IP address, and the classification of the source device,
wherein the MAC address is used as a key to search entries in the data structure.

10. The method of claim 1, further comprising:
receiving, by the device management system, the second message; and
generating, by the device management system, a configuration file destined for the source device,
wherein adding the source device as a managed device is in response to confirming, by the device management system, the source device based on the generated configuration file.

11. A computer system for facilitating device discovery, the computer system comprising:
a processor; and
a storage device storing instructions that when executed by the processor cause the processor to perform a method, the method comprising:
detecting, by the computer system, a first message which is broadcast from a source device based on a network communication protocol;
determining a classification which indicates a type for the source device based on a Media Access Control (MAC) address of the source device extracted from the first message and further based on learned classifications for organizationally unique identifiers (OUIs) and a respective OUT extracted from the MAC address;
improving the determined classification by sending a local query to the source device based on the MAC address;
generating a second message which indicates the MAC address, an Internet Protocol (IP) address of the source device obtained based on the first message, and the classification, wherein the second message further indicates a reason for the classification, and wherein the reason is based on a result of sending the local query;
sending the second message to a device management system, which causes the device management system to add the source device as a managed device; and
enhancing device discovery by eliminating a direct scan of all devices on a sub-network by the device management system for devices of a same type as the type for the source device.

12. The computer system of claim 11, wherein in response to determining that the network communication protocol is an Address Resolution Protocol (ARP), the method further comprises:
extracting from the first message the MAC address and the IP address of the source device; and
storing, in a data structure, the MAC address, the IP address, and the classification of the source device.

13. The computer system of claim 11, wherein in response to determining that the network communication protocol is a Dynamic Host Configuration Protocol (DHCP) and subsequent to determining the classification, the method further comprises:
extracting from the first message the MAC address of the source device;
generating a reverse Address Resolution Protocol (ARP) packet which includes a destination MAC address which is the MAC address of the source device, and further includes a query for the IP address of the source device;
in response to transmitting the reverse ARP packet to the source device, obtaining the IP address of the source device; and
storing, in a data structure, the MAC address, the obtained IP address, and the classification of the source device.

14. The computer system of claim 11, wherein detecting the first message is further based on one or more of:
a rendezvous protocol which allows the computer system to determine the classification with a high level of confidence; and
a link broadcast which allows the computer system to:
obtain a link-local address or a discovery gateway; and
use the obtained link-local address or discovery gateway to extract
the MAC address of the source device.

15. The computer system of claim 11, wherein the method further comprises:
learning classifications for the OUIs by:
reporting all learned OUIs to the device management system; and
receiving feedback from the device management system which indicates one or more of:
a corresponding classification for a respective OUI;
a first list of OUIs which are to be classified as a same type as the type for the source device;
a second list of OUIs which are not to be classified as the same type as the type for the source device; and
a third list of OUIs which are to remain unclassified.

16. The computer system of claim 11,
wherein improving the determined classification by sending the local query to the source device based on the MAC address involves one or more of:
connecting to a Line Printer Remote (LPR) protocol port;
connecting to an Internet Printing Protocol (IPP) port;
sending a Simple Network Management Protocol (SNMP) query;
querying a configuration for an Internet Printing Protocol (IPP); and
in response to sending a HyperText Transfer Protocol (HTTP) request, analyzing headers of a responsive HTTP packet.

17. The computer system of claim 11, wherein the second message further indicates one or more of:
an identifier for the computer system;
a time associated with generating the second message; and
a confidence rating which indicates a level of certainty that the classification of the source device is accurate.

18. The computer system of claim 11, wherein the source device is a printer, wherein the device management system is a printer management system, and wherein the computer system is a network probe device or another printer managed by the printer management system.

19. The computer system of claim 11, wherein the method further comprises:
storing, in a data structure, an entry which includes the MAC address, the IP address, and the classification of the source device,
wherein the MAC address is used as a key to search entries in the data structure.

20. The computer system of claim 11, wherein the method further comprises:
receiving, by the device management system, the second message; and
generating, by the device management system, a configuration file destined for the source device,
wherein adding the source device as a managed device is in response to confirming, by the device management system, the source device based on the generated configuration file.

* * * * *